United States Patent
Lee

(10) Patent No.: US 12,141,471 B2
(45) Date of Patent: Nov. 12, 2024

(54) STORAGE DEVICE AND OPERATING METHOD UTILIZING A BUFFER WHEN A WRITE FAILURE OCCURS

(71) Applicant: SK hynix Inc., Gyeonggi-do (KR)

(72) Inventor: Chul Woo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/957,075

(22) Filed: Sep. 30, 2022

(65) Prior Publication Data

US 2023/0305741 A1    Sep. 28, 2023

(30) Foreign Application Priority Data

Mar. 24, 2022   (KR) .................. 10-2022-0036890

(51) Int. Cl.
*G06F 3/06*    (2006.01)
(52) U.S. Cl.
CPC .......... *G06F 3/0656* (2013.01); *G06F 3/0607* (2013.01); *G06F 3/0658* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 2010/0269015 A1* | 10/2010 | Borchers | ............. | G06F 12/0813 710/308 |
| 2011/0161784 A1* | 6/2011 | Selinger | ............. | G06F 11/1016 714/E11.002 |
| 2015/0155044 A1* | 6/2015 | Yin | ........................ | G06F 3/0656 365/185.24 |
| 2016/0196216 A1* | 7/2016 | Lee | ........................ | G06F 3/0631 711/170 |
| 2018/0074751 A1* | 3/2018 | Ngu | ........................ | G06F 3/0659 |

(Continued)

FOREIGN PATENT DOCUMENTS

| | | |
|---|---|---|
| KR | 10-2014-0142793 A | 12/2014 |
| KR | 10-2019-0004400 A | 1/2019 |
| KR | 10-2020-0113989 A | 10/2020 |

OTHER PUBLICATIONS

Webopedia Staff, "Bit Meaning & Definition", Jan. 27, 2021, pp. 1-4, https://web.archive.org/web/20210127013948/https://www.webopedia.com/definitions/bit/ (Year: 2021).*

*Primary Examiner* — Christopher D Birkhimer
(74) *Attorney, Agent, or Firm* — IP & T GROUP LLP

(57) ABSTRACT

The present disclosure relates to a storage device including a memory device having a plurality of memory cells and performing a program operation to store write data in the plurality of memory cells, a buffer memory device temporarily storing therein the write data, and a memory controller controlling the buffer memory device and the memory device to temporarily store in the buffer memory device, the write data received from a host memory included in a host and provide the write data from the buffer memory device to the memory device in response to a write command received from the host, wherein the memory controller comprises a buffer memory manager determining, based on a used capacity of the buffer memory device whether to transfer, to the host, a command completion with respect to the write command at a first time point or a second time point.

8 Claims, 12 Drawing Sheets

(56) References Cited

U.S. PATENT DOCUMENTS

2018/0260136 A1\* 9/2018 Huo ..................... G06F 3/0659
2019/0171392 A1\* 6/2019 Kim ................... G06F 13/1673
2021/0303206 A1\* 9/2021 Saxena ................ G06F 3/0604

\* cited by examiner

STORAGE DEVICE AND OPERATING METHOD UTILIZING A BUFFER WHEN A WRITE FAILURE OCCURS

CROSS-REFERENCE TO RELATED APPLICATION

The present application claims priority under 35 U.S.C. § 119(a) to Korean patent application number 10-2022-0036890 filed on Mar. 24, 2022, the entire disclosure of which is incorporated by reference herein.

BACKGROUND

Field of Invention

Various embodiments relate generally to a storage device, and more particularly, to a storage device and an operating method thereof.

Description of Related Art

A storage device is configured to store data in response to control of a host device such as a computer or a smartphone. A storage device may include a memory device which stores data and a memory controller which controls the memory device. Memory devices may be divided into volatile memory devices and non-volatile memory devices.

A volatile memory device may retain data as long as power is being supplied, and may lose the stored data in the absence of a power supply. Types of volatile memory devices may include Static Random Access Memory (SRAM), Dynamic Random Access Memory (DRAM), and the like.

A non-volatile memory device may not lose data even in the absence of a power supply. Types of non-volatile memory devices may include Read Only Memory (ROM), Programmable ROM (PROM), Electrically Programmable ROM (EPROM), Electrically Erasable and Programmable ROM (EEPROM), flash memory, and the like.

SUMMARY

Various embodiments of the present disclosure are directed to a storage device efficiently using a buffer memory device and a method of operating the storage device.

According to an embodiment of the present disclosure, a storage device may include a memory device including a plurality of memory cells and performing a program operation to store write data in the plurality of memory cells, a buffer memory device temporarily storing therein the write data, and a memory controller controlling the buffer memory device and the memory device to temporarily store in the buffer memory device, the write data received from a host memory included in a host and provide the write data from the buffer memory device to the memory device in response to a write command received from the host, wherein the memory controller comprises a buffer memory manager determining, based on a used capacity of the buffer memory device whether to transfer, to the host, a command completion with respect to the write command at a first time point or a second time point.

According to an embodiment of the present disclosure, a storage device may include a memory device including a plurality of memory cells and configured to perform a write operation to store write data in the plurality of memory cells, a buffer memory device temporarily storing the write data to be provided to the memory device, and a memory controller controlling the buffer memory device and the memory device to fetch the write data from a host memory to the buffer memory device and provide, to the memory device, the write data temporarily stored in the buffer memory device in response to a write request received from a host, wherein the memory controller includes a buffer memory manager determining, based on the write request including a multi-program flag indicating a plurality of program operations, whether to transfer, to the host, command completion with respect to the write command at a first time point or a second time point.

According to an embodiment of the present disclosure, a method of operating a memory controller may include receiving a write command from a host, allocating, to a buffer memory device, write data corresponding to the write command and received from a host memory, storing the write data in the buffer memory device, determining when to transfer, to the host, command completion with respect to the write command, providing a memory device with a program command and the write data stored in the buffer memory device, and controlling the memory device to perform a program operation with the provided write data.

According to an embodiment of the present disclosure, an operating method of a controller may include controlling a memory device to store therein buffered data according to a write request, and responding to the write request before or after the controlling the memory device according to a current amount of the buffered data.

According to an embodiment of the present disclosure, an operating method of a controller may include controlling a memory device to store therein buffered data according to a write request, and responding to the write request before or after the controlling according to a multi-program flag within the write request.

DETAILED DESCRIPTION

Specific structural or functional descriptions of embodiments in accordance with concepts which are disclosed in this specification are illustrated only to describe the embodiments in accordance with the concepts and the embodiments in accordance with the concepts may be carried out by various forms but the descriptions are not limited to the embodiments described in this specification.

Figure 1:
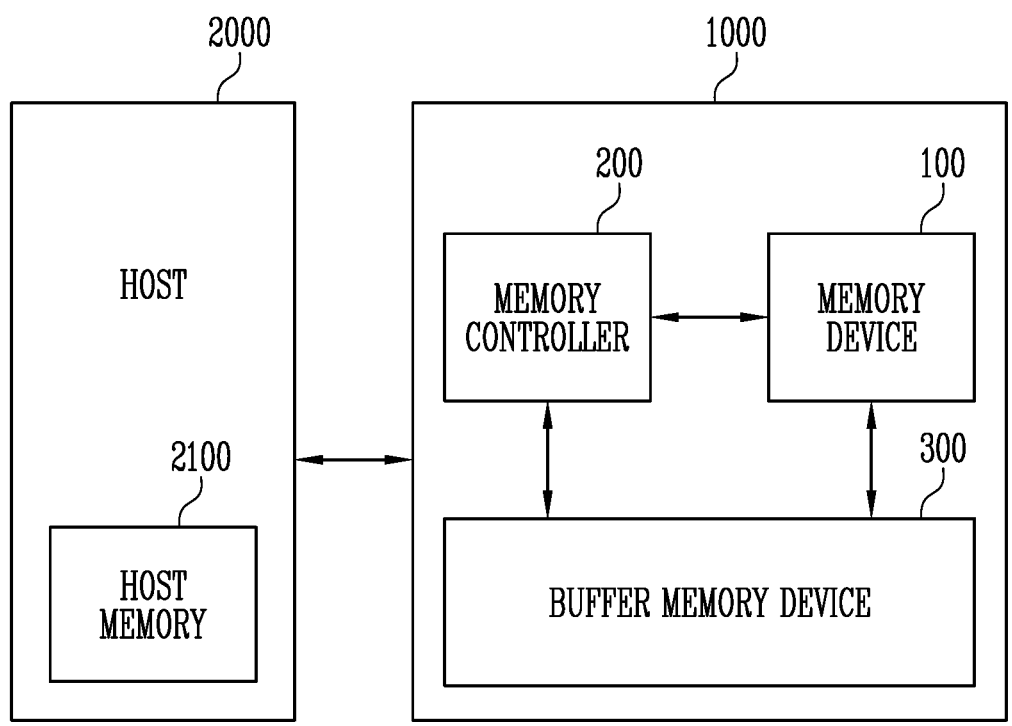
FIG. 1 is a block diagram illustrating a storage device according to an embodiment of the present disclosure.

FIG. 1 is a block diagram illustrating a storage device 1000 according to an embodiment of the present disclosure.

Referring to FIG. 1, the storage device 1000 may include a memory device 100, a memory controller 200, and a buffer memory device 300.

The storage device 1000 may be configured to store data in response to control of a host 2000. Examples of the storage device 1000 may include a cellular phone, a smartphone, an MP3 player, a laptop computer, a desktop computer, a game player, a display device, a tablet PC, and an in-vehicle infotainment system.

The storage device 1000 may be manufactured as one of various types of storage devices according to a host interface corresponding to a communication method with the host 2000. For example, the storage device 1000 may be configured as any of various storage devices such as a secure digital card in the form of an SSD, an SD, a mini-SD and a micro-SD, a universal serial bus (USB) storage device, a Personal Computer Memory Card International Association (PCMCIA) card type storage device, a peripheral component interconnection (PCI) card type storage device, a PCI express (PCI-e or PCIe) card type storage device, a compact flash (CF) card, a smart media card, and a memory stick.

The storage device 1000 may be manufactured as any of various types of packages. For example, the storage device 1000 may be manufactured as any of various package types, such as a package-on-package (POP), a system-in-package (SIP), a system-on-chip (SOC), a multi-chip package (MCP), a chip-on-board (COB), a wafer-level fabricated package (WFP), and a wafer-level stack package (WSP).

The memory device 100 may store data or utilize stored data. More specifically, the memory device 100 may operate in response to control of the memory controller 200. In addition, the memory device 100 may include a plurality of memory dies, and each of the memory dies may include a memory cell array including a plurality of memory cells storing data.

Each of the memory cells may be configured as a single level cell (SLC) which stores one data bit, a multi-level cell (MLC) which stores two data bits, a triple level cell (TLC) which stores three data bits, or a quad level cell (QLC) which stores four data bits.

The memory cell array may include a plurality of memory blocks. Each of the plurality of memory blocks may include a plurality of memory cells. Each memory block may include a plurality of pages. A page may be a unit for storing data in the memory device 100, or a unit for reading data stored in the memory device 100.

Examples of the memory device 100 may include Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, vertical NAND flash memory, NOR flash memory, resistive random access memory (RRAM), phase-change random access memory (PRAM), magnetoresistive random access memory (MRAM), ferroelectric random access memory (FRAM), and spin transfer torque random access memory (STT-RAM). In this specification, by way of example, features and aspects of the invention are described in the context in which the memory device 100 is a NAND flash memory.

The memory device 100 may receive a command and an address from the memory controller 200. The memory device 100 may be configured to access an area selected in response to the received address in the memory cell array. When the memory device 100 accesses the selected area, the memory device 100 may perform an operation corresponding to the received command on the selected area. For example, the memory device 100 may perform a write operation (program operation), a read operation, and an erase operation. A program operation may refer to an operation by which the memory device 100 writes data into the area selected by the address. A read operation may refer to an operation by which the memory device 100 reads data from the area selected by the address. An erase operation may refer to an operation by which the memory device 100 erases the data stored in the area selected by the address.

The memory controller 200 may control general operations of the memory device 100. More specifically, the memory controller 200 may execute firmware FW when power is applied to the storage device 1000. The firmware FW may include a host interface layer (HIL) that receives a request input from the host 2000 or outputs a response to the host 2000, a flash translation layer (FTL) that manages operations between an interface of the host 2000 and an interface of the memory device 100, and a flash interface layer (FIL) that provides a command to the memory device 100 or receives a response from the memory device 100.

The memory controller 200 may receive data and a logical address LA from the host 2000 and convert (or translate) the logical address LA into a physical address PA which indicates an address of memory cells where the data in the memory device 100 is stored. The logical address LA may be a logical block address LBA and the physical address PA may be a physical block address PBA.

The memory controller 200 may control the memory device 100 to perform a program operation, a read operation, or an erase operation in response to a request from the host 2000. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

The memory controller 200 may control the memory device 100 so that a program operation, a read operation or an erase operation may be performed regardless of a request from the host 2000. For example, the memory controller 200 may control the memory device 100 to perform a program operation, a read operation, or an erase operation used to perform background operations such as wear leveling, garbage collection and read reclaim.

The buffer memory device 300 may store data received from the host 2000, or store data to be transferred to the host 2000. More specifically, during a write operation, the buffer memory device 300 may temporarily store write data before transferring the write data to the memory device 100 from the host 2000. In addition, the buffer memory device 300 may temporarily store data requested by the host 2000 before transferring the data to the host 2000.

According to an embodiment, the buffer memory device 300 may flush the stored data to the memory device 100 in response to control of the memory controller 200. The memory controller 200 may control the buffer memory device 300 to provide the temporarily stored data to the memory device 100. In addition, the memory controller 200 may control the buffer memory device 300 to remove specific data from the buffer memory device 300. The buffer memory device 300 may release data allocated to the buffer memory device 300 in response to control of the memory controller 200.

The host 2000 may communicate with the storage device 1000 by using at least one of various communication standards or interfaces, such as a Universal Serial bus (USB), a Serial Attached SCSI (SAS), a High Speed InterChip (HSIC), a Small Computer System Interface (SCSI), Peripheral Component Interconnection (PCI), PCI express (PCIe), Non-Volatile Memory express (NVMe), Secure Digital (SD), a Dual In-line Memory Module (DIMM), Registered DIMM (RDIMM), and/or Load Reduced DIMM (LRDIMM).

The host 2000 may include a host memory 2100. The host memory 2100 may store write data allocated to the host memory 2100, i.e., user data. According to an embodiment, the storage device 1000 and the host 2000 may use a protocol which allows access to the host memory 2100 without a separate request. For example, when the storage device 1000 and the host 2000 communicate with each other using a protocol based on PCIe, the storage device 1000 may access the host memory 2100 without sending a separate request to the host 2000. In addition, the storage device 1000 may copy write data corresponding to a write request received from the host 2000 to a memory inside the storage device 1000 in response to the write request.

Figure 2:
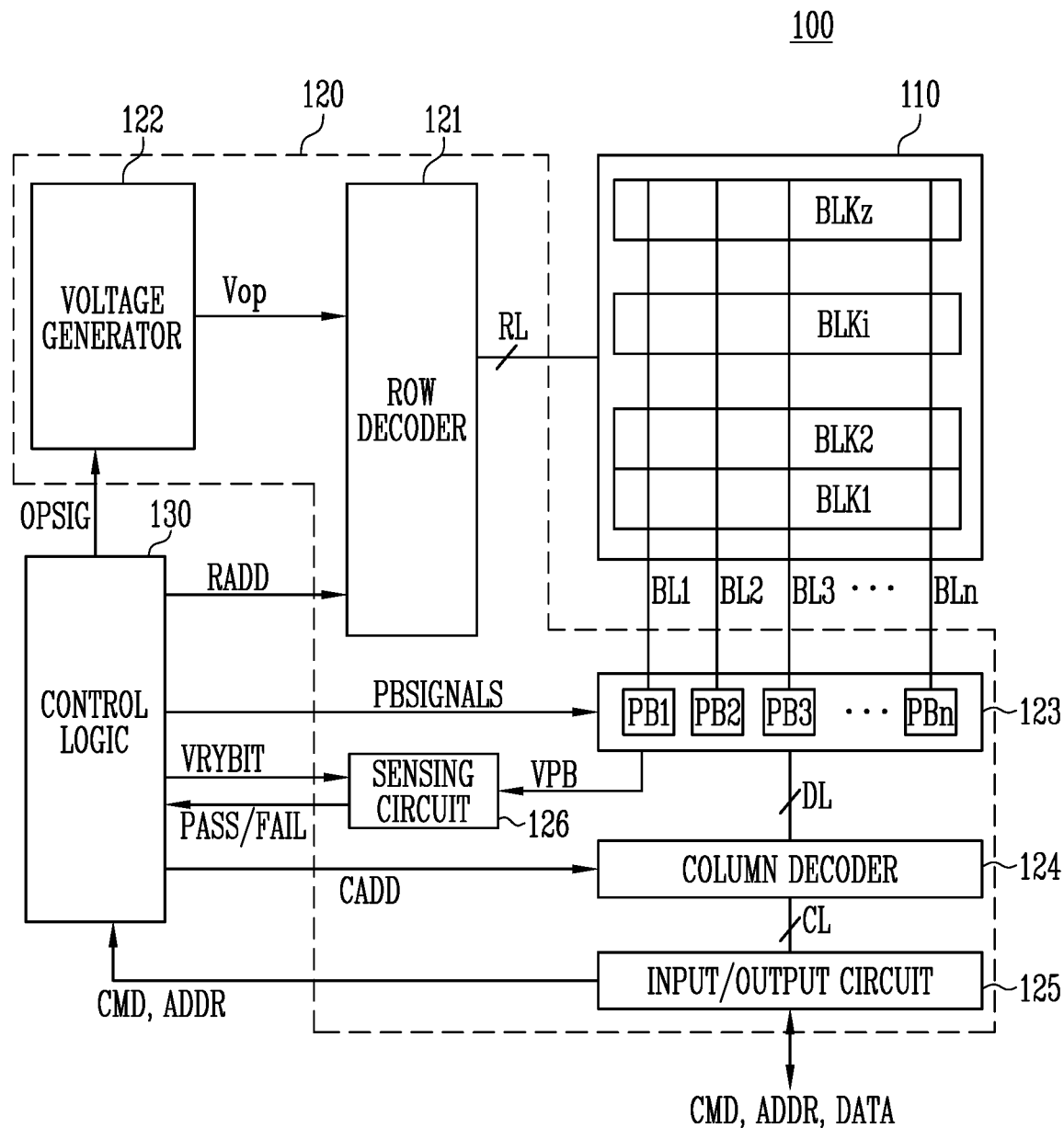
FIG. 2 is a block diagram illustrating a memory device according to an embodiment of the present disclosure.

FIG. 2 is a block diagram illustrating the memory device 100 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz may be coupled to a row decoder 121 through row lines RL. The row lines RL may include at least one source select line, a plurality of word lines, and at least one drain select line. The plurality of memory blocks BLK1 to BLKz may be coupled to a page buffer group 123 through first to nth bit lines BL1 to BLn. Each of the plurality of memory blocks BLK1 to BLKz may include a plurality of memory cells. According to an embodiment, the plurality of memory cells may be non-volatile memory cells. Memory cells coupled to the same word line may be defined as one page. Therefore, each memory block may include a plurality of pages.

Each of the memory cells included in the memory cell array 110 may be configured as a single level cell (SLC) which stores one data bit, a multi-level cell (MLC) which stores two data bits, a triple level cell (TLC) which stores three data bits, or a quad level cell (QLC) which stores four data bits.

The peripheral circuit 120 may be configured to perform a program operation, a read operation, or an erase operation on a selected area of the memory cell array 110 in response to control of the control logic 130. The peripheral circuit 120 may drive the memory cell array 110 in response to the control logic 130. For example, the control logic 130 may control the peripheral circuit 120 to apply various operating voltages to the row lines RL and the first to nth bit lines BL1 to BLn, or to discharge the applied voltages.

More specifically, the peripheral circuit 120 may include the row decoder 121, a voltage generator 122, the page buffer group 123, a column decoder 124, an input/output circuit 125, and a sensing circuit 126.

The row decoder 121 may be coupled to the memory cell array 110 through the row lines RL. The row lines RL may include at least one source select line, a plurality of word lines, and at least one drain select line. According to an embodiment, the word lines may include normal word lines and dummy word lines. In addition, the row lines RL may further include a pipe select line.

The row decoder 121 may be configured to operate in response to control of the control logic 130. The row decoder 121 may receive a row address RADD from the control logic 130. More specifically, the row decoder 121 may be configured to decode the row address RADD. The row decoder 121 may select at least one memory block among the memory blocks BLK1 to BLKz according to the decoded address. The row decoder 121 may select at least one word line WL of the selected memory block to apply voltages generated by the voltage generator 122 to at least one word line WL according to the decoded address.

For example, during a program operation, the row decoder 121 may apply a program voltage to a selected word line and a program pass voltage having a lower voltage level than the program voltage to unselected word lines. During a program verify operation, the row decoder 121 may apply a verify voltage to the selected word line and a verify pass voltage greater than the verify voltage to the unselected word lines. During a read operation, the row decoder 121 may apply a read voltage to the selected word line and a read pass voltage greater than the read voltage to the unselected word lines.

According to an embodiment, an erase operation of the memory cell array 110 may be performed in units of memory blocks. During an erase operation, the row decoder 121 may select one of the memory blocks according to the decoded address, and the row decoder 121 may apply a ground voltage to word lines coupled to the selected memory block.

The voltage generator 122 may operate in response to control of the control logic 130. More specifically, the voltage generator 122 may be configured to generate a plurality of voltages by using an external power voltage supplied to the memory device 100 in response to the control logic 130. For example, the voltage generator 122 may generate a program voltage, a verify voltage, a pass voltage, a read voltage, and an erase voltage in response to the control of the control logic 130. The voltage generator 1222 may generate various operating voltages Vop for program, read and erase operations in response to an operation signal OPSIG. According to an embodiment, the control logic 130 may control the voltage generator 122 to generate a pre-verify voltage used in a pre-verify operation and a main verify voltage used in a main verify operation as well as a program voltage used in a program operation.

According to an embodiment, the voltage generator 122 may generate an internal power voltage by regulating the external power voltage. The internal power voltage generated by the voltage generator 122 may serve as an operating voltage of the memory cell array 110.

According to an embodiment, the voltage generator 122 may generate a plurality of voltages by using the external power voltage or the internal power voltage. For example, the voltage generator 122 may include a plurality of pumping capacitors which receive the internal power voltage and may generate a plurality of voltages by selectively activating the plurality of pumping capacitors in response to the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be coupled to the memory cell array 110 through the first to nth bit lines BL1 to BLn, respectively. In addition, the first to nth page buffers PB1 to PBn may operate in response to control the control logic 130. More specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or may sense voltages or currents in the first to nth bit lines BL1 to BLn during a read or verify operation.

More specifically, during a program operation, the first to nth page buffers PB1 to PBn may transfer data DATA received through the input/output circuit 125 to selected memory cells through the first to nth bit lines BL1 to BLn when a program pulse is applied to a selected word line. Memory cells of the selected page may be programmed according to the transferred data DATA. A memory cell coupled to a bit line to which a program permission voltage (e.g., a ground voltage) is applied may have an increased threshold voltage. A threshold voltage of a memory cell coupled to a bit line to which a program inhibition voltage (for example, a power voltage) is applied may be maintained.

During a program verify operation, the first to nth page buffers PB1 to PBn may read page data from the selected memory cells through the first to nth bit lines BL1 to BLn, respectively.

During a read operation, the first to nth page buffers PB1 to PBn may read the data DATA from the memory cells of the selected page through the first to nth bit lines BL1 to BLn and may output the read data DATA to the input/output circuit 125 in response to control of the column decoder 124.

During an erase operation, the first to nth page buffers PB1 to PBn may float the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL, or may exchange data with the input/output circuit 1140 through column lines CL.

The input/output circuit 125 may transfer a command CMD and an address ADDR from the memory controller 200 to the control logic 130, or may exchange the data DATA with the column decoder 124.

The sensing circuit 126 may generate a reference current in response to an allowable bit signal VRYBIT and compare a sensing voltage VPB received from the page buffer group 123 with a reference voltage generated by the reference current to output a pass signal PASS or a fail signal FAIL during a read operation or a verify operation.

The control logic 130 may control the peripheral circuit 120 by outputting the operation signal OPSIG, the row address RADD, the page buffer control signals PBSIGNALS, and the allowable bit signal VRYBIT in response to the command CMD and the address ADDR.

In addition, the control logic 130 may determine whether the verify operation passes or fails in response to the pass or fail signal PASS or FAIL. In addition, the control logic 130 may control the page buffer group 123 to temporarily store verify operation results including the pass or fail signal PASS or FAIL in the page buffer group 123. More specifically, the control logic 130 may determine a program state of a memory cell in response to the pass signal PASS or the fail signal FAIL. For example, when a memory cell operates as a triple level cell (TLC), the control logic 130 may determine whether a program state of the memory cell is an erase state E or one of first to seventh program states P1 to P7.

Figure 3:
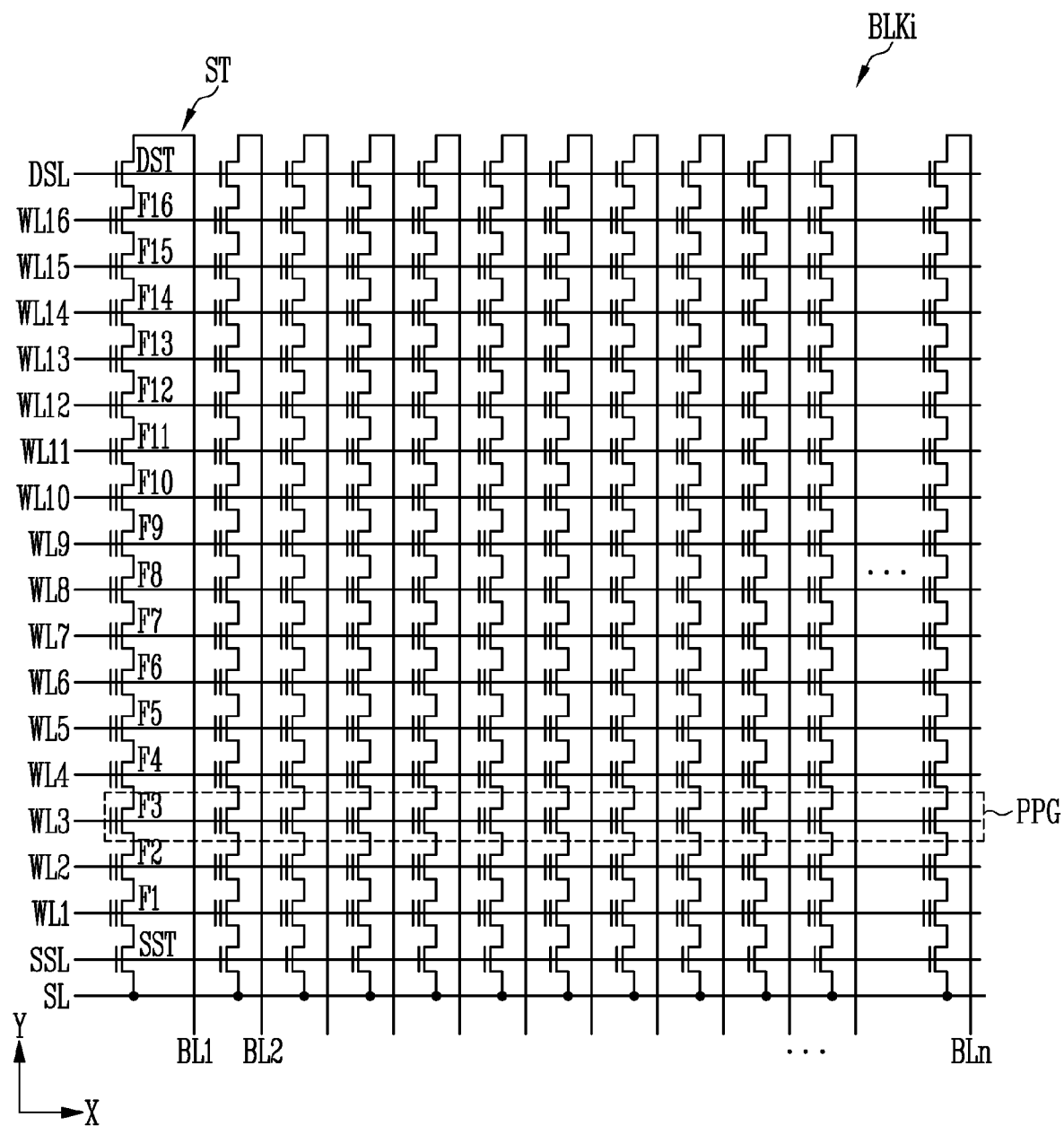
FIG. 3 is a block diagram illustrating a memory block according to an embodiment of the present disclosure.

FIG. 3 is a block diagram illustrating a memory block BLKi according to an embodiment of the present disclosure.

Referring to FIG. 3, the memory block BLKi may be coupled to a plurality of word lines that are arranged in parallel between a first select line and a second select line. The first select line may be a source select line SSL and the second select line may be a drain select line DSL. More specifically, the memory block BLKi may include a plurality of strings ST that are coupled between the first to nth bit lines BL1 to BLn and a source line SL. The first to nth bit lines BL1 to BLn may be coupled to the strings ST, respectively, and the source line SL may be coupled in common to the strings ST. Since the strings ST may have the same configuration, the string ST which is coupled to the first bit line BL1 will be described in detail by way of example.

The string ST may include a source select transistor SST, a plurality of memory cells F1 to F16, and a drain select transistor DST coupled in series between the source line SL and the first bit line BL1. One string ST may include at least one source select transistor SST and at least one drain select transistor DST, and more memory cells than the memory cells F1 to F16 as shown in FIG. 3 may be included in the string ST.

A source of the source select transistor SST may be coupled to the source line SL and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to a plurality of word lines WL1 to WL16. A group of memory cells coupled to the same word line, among memory cells included in different strings ST, may be referred to as a physical page PPG. Therefore, the memory block BLKi may include as many physical pages PPG as the number of word lines WL1 to WL16.

Each of the memory cells may be configured as a single level cell (SLC) which stores one data bit, a multi-level cell (MLC) which stores two data bits, a triple level cell (TLC) which stores three data bits, or a quad level cell (QLC) which stores four data bits.

The single level cell (SLC) may include one-bit data. One physical page PPG of the single level cell may store one logical page (LPG) data. Data of the single logical page LPG may include as many data bits as the number of cells included in the single physical page PPG.

The multi-level cell (MLC), the triple level cell (TLC), and the quad level cell (QLC) may store two or more bits of data. One physical page PPG may store data of at least two logical pages LPG.

Figure 4:
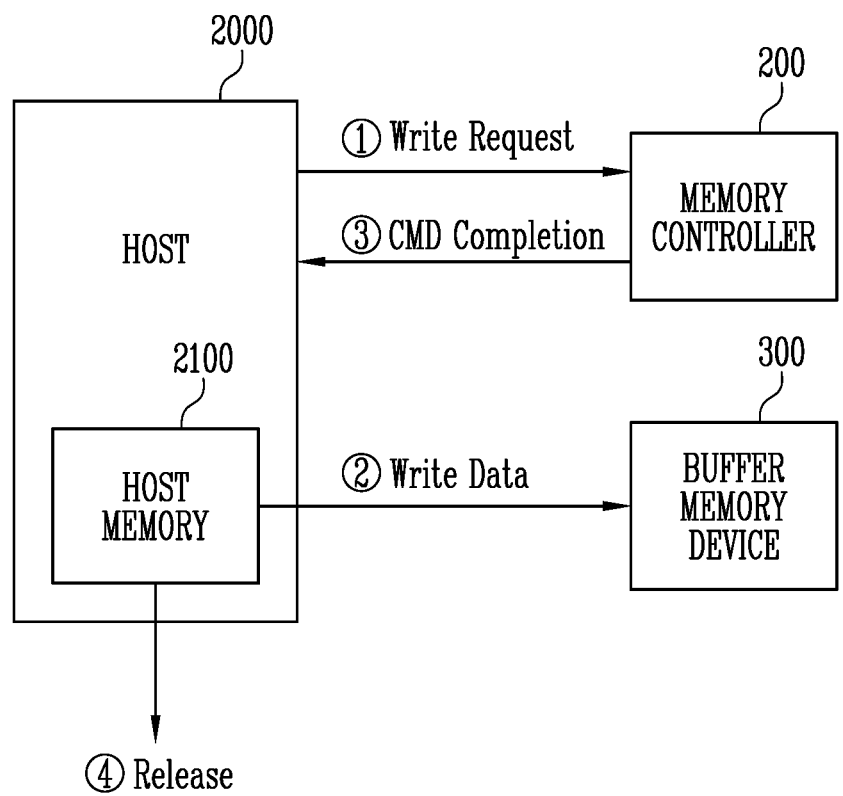
FIG. 4 is a block diagram illustrating operations of a host memory according to an embodiment of the present disclosure.

FIG. 4 is a block diagram illustrating the host memory 2100 according to an embodiment of the present disclosure.

Referring to FIG. 4, the host 2000, the memory controller 200, and the buffer memory device 300 may perform communication during a write operation.

The host 2000 may request a write operation for storing user data in the memory device 100. The storage device 1000 may acquire the user data from the host 2000 in response to the request from the host 2000. For example, the host 2000 may transfer a write request for a write operation to the memory controller 200. In response to the write request, the memory controller 200 may control the buffer memory device 300 to copy write data from the host memory 2100 to the buffer memory device 300. More specifically, the memory controller 200 may allocate the write data to the buffer memory device 300 in response to the write request, and the buffer memory device 300 may store the write data loaded from the host memory 2100.

When the write data is buffered in the buffer memory device 300, the memory controller 200 may transfer command (CMD) completion to indicate that a series of processes with respect to a write command as requested by the host 2000 are completed.

When the host 2000 receives the CMD completion from the memory controller 200, the host 2000 may release the write data stored in the host memory 2100. In other words, the host 2000 may store other data in the host memory 2100 after receiving the CMD completion.

After the memory controller 200 transfers the CMD completion to the host 2000, the memory controller 200 may control the buffer memory device 300 to buffer the write data until the write data is completely stored in the memory device 100.

Figure 5:
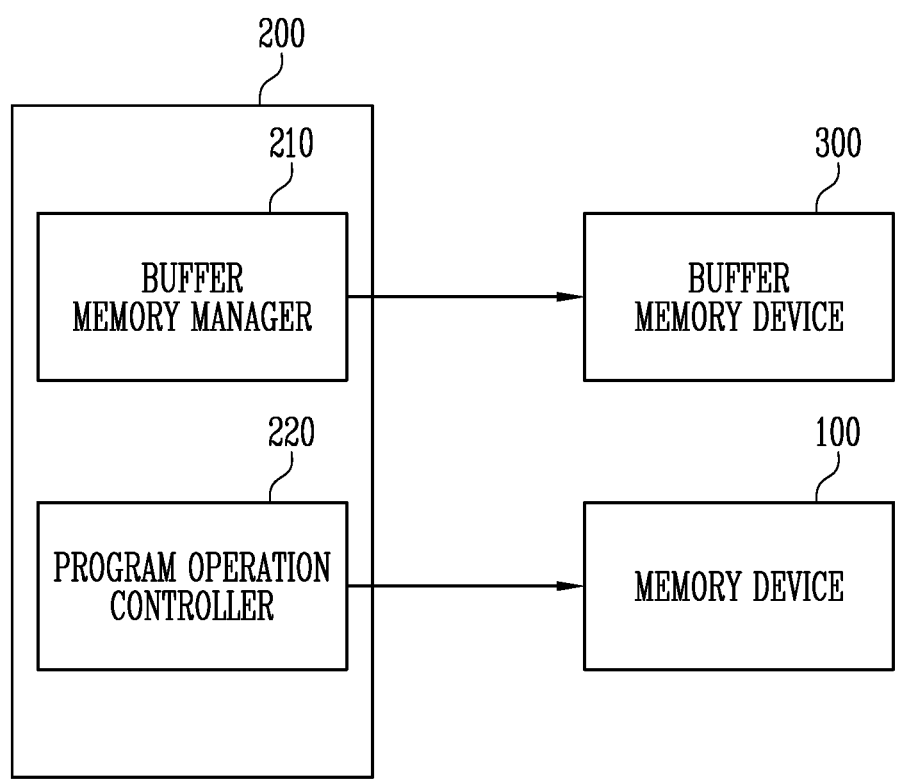
FIG. 5 is a block diagram illustrating a memory controller according to an embodiment of the present disclosure.

FIG. 5 is a block diagram illustrating the memory controller 200 according to an embodiment of the present disclosure.

Referring to FIG. 5, the memory controller 200 may include a buffer memory manager 210 and a program operation controller 220.

The buffer memory manager 210 may control the buffer memory device 300. More specifically, the buffer memory manager 210 may control the buffer memory device 300 to allocate write data to the buffer memory device 300, or to release the allocated write data.

In addition, the buffer memory manager 210 may determine when to transfer CMD completion on the basis of a used capacity or a remaining capacity of the buffer memory device 300. In one embodiment, the used capacity of the buffer memory device 300 may be an amount of capacity that has been used among the total capacity of the buffer memory device 300. According to an embodiment, the buffer memory manager 210 may determine whether CMD completion with respect to a write command is transferred at a first time point or a second time point on the basis of the used capacity or the remaining capacity of the buffer memory device 300. More specifically, the buffer memory manager 210 may determine to transfer the CMD completion at the first time point when the used capacity of the buffer memory device 300 is less than a threshold. More specifically, the buffer memory manager 210 may determine to transfer the CMD completion at the second time point when the used capacity of the buffer memory device 300 is more than the threshold. The first time point may refer to a point in time after the write data is transferred from the host memory 2100 to the buffer memory device 300. The second time point may refer to a point in time after a write operation of storing the write data in the memory cells is normally completed.

In one embodiment, the buffer memory manager 210 may determine whether CMD completion with respect to a write command is transferred at a first time point or a second time point on the basis of the a size of the write data of the buffer memory device 300. For example, the buffer memory manager 210 may determine to transfer the CMD completion at the first time point when the size of the write data stored in the buffer memory device 300 is less than a threshold. The buffer memory manager 210 may determine to transfer the CMD completion at the second time point when the size of the write data stored in the buffer memory device 300 is more than the threshold.

In addition, when the buffer memory manager 210 determines to transfer the CMD completion at the second time point, the buffer memory manager 210 may control the buffer memory device 300 to release the write data buffered in the buffer memory device 300. After the write data allocated to the buffer memory device 300 is released, if the write operation of the memory device 100 on the write data fails, the memory controller 200 may control the buffer memory device 300 to fetch data corresponding to the write data to the buffer memory device 300.

According to another embodiment, the buffer memory manager 210 may determine when to transfer the CMD completion on the basis of a write request including a multi-program flag which indicates a plurality of program operations. The multi-program flag may mean that the write operation requested by the host 2000 is for requesting a plurality of program operations. More specifically, when the multi-program flag is set, it may include a multi-plane program operation for requesting a program operation on a plurality of dies or a plurality of planes, a sequential program operation for storing sequential logical addresses of data in a plurality of pages, or a stripe program operation.

According to an embodiment, when receiving a write request including a multi-program flag, the buffer memory manager 210 may determine to transfer CMD completion with respect to the write request at a first time point or a second time point according to the multi-program flag. For example, when the multi-program flag has a value of 0 (zero), the buffer memory manager 210 may determine to transfer the CMD completion at the first time point. However, when the multi-program flag has a value of 1 (one), the buffer memory manager 210 may determine to transfer the CMD completion at the second time point. The first time point may refer to a point in time after the write data is transferred from the host memory 2100 to the buffer memory device 300. The second time point may refer to a point in time after a write operation of storing write data into memory cells is normally completed. The program operation controller 220 may control the memory device 100 to perform a program operation. More specifically, when the program operation controller 220 receives the write request from the host 2000, the program operation controller 220 may transfer a program command to the memory device 100 so that the memory device 100 may perform the program operation.

Figure 6:
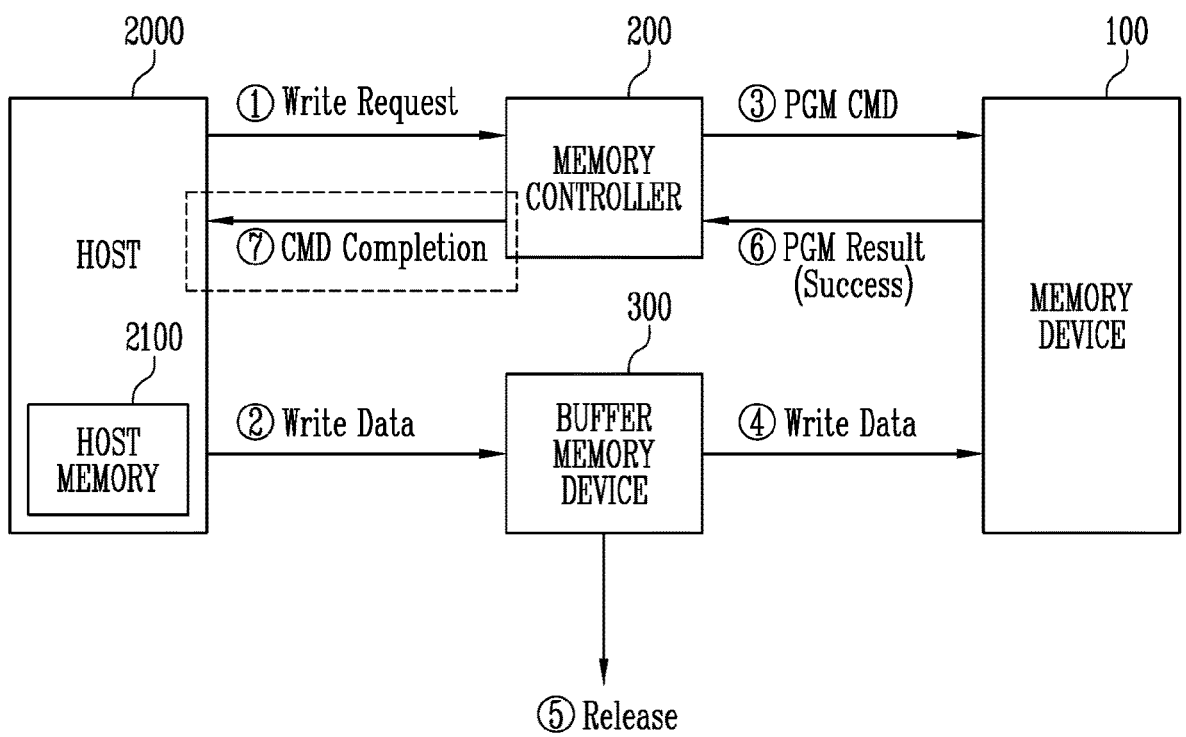
FIG. 6 is a block diagram illustrating a write operation of a storage device according to an embodiment of the present disclosure.
Figure 7:
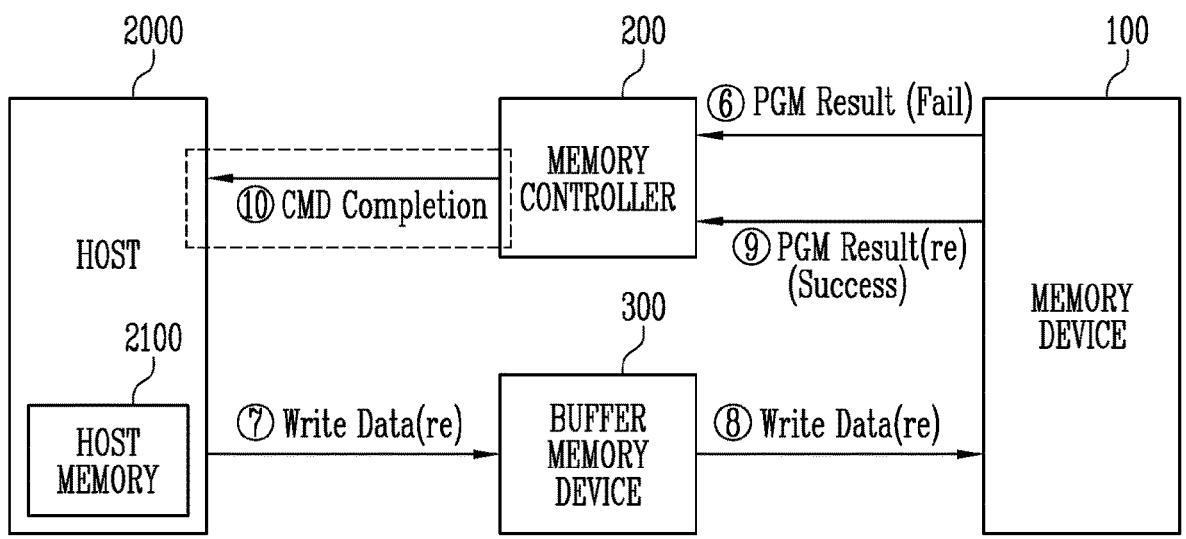
FIG. 7 is a block diagram illustrating a write operation of a storage device according to an embodiment of the present disclosure.

FIGS. 6 and 7 are block diagrams illustrating a write operation of a storage device according to an embodiment of the present disclosure.

Referring to FIGS. 6 and 7, after a write operation is completed, the memory controller 200 may transfer CMD completion to the host 2000.

Referring to FIG. 6, when the memory controller 200 receives a write request from the host 2000, the memory controller 200 may allocate write data corresponding to the write request to the buffer memory device 300. In addition, the memory controller 200 may control the buffer memory device 300 so that the write data stored in the host memory 2100 may be stored in the buffer memory device 300.

In addition, the memory controller 200 may transfer a program command to the memory device 100 and control the buffer memory device 300 to transfer the write data buffered in the buffer memory device 300 to the memory device 100. When the memory device 100 receives the program command and the write data from the memory controller 200 and the buffer memory device 300, the memory device 100 may perform a program operation corresponding to the program command and the write data. Since the memory controller 200 does not transfer CMD completion to the host 2000, the memory controller 200 may release the write data allocated to the buffer memory device 300. By releasing the write data allocated to the buffer memory device 300, the memory controller 200 may use the buffer memory device 300 with efficiency.

In addition, the memory device 100 may transfer a result of the program operation to the memory controller 200. When the program operation is successful, the memory controller 200 may transfer CMD completion to the host 2000. When the program operation of the write data succeeds, the write operation may be completed. Accordingly, the memory controller 200 may transfer the CMD completion to the host 2000.

A case in which a program operation fails will be described below in more detail with reference to FIG. 7.

Referring to FIG. 7, the memory device 100 may transfer a result of the program operation to the memory controller 200. When the program operation fails, the memory device 100 may inform the memory controller 200 that the program operation has failed. In addition, the memory controller 200 may re-allocate write data to the buffer memory device 300 and control the buffer memory device 300 to fetch data corresponding to the write data from the host memory 2100. When the data corresponding to the write data is fetched from the host memory 2100, the memory controller 200 may control the buffer memory device 300 to transfer the data corresponding to the write data to the memory device 100. In addition, when a program operation on the data corresponding to the write data by the memory device 100 succeeds, the memory controller 200 may transfer CMD completion to the host 2000.

Figure 8:
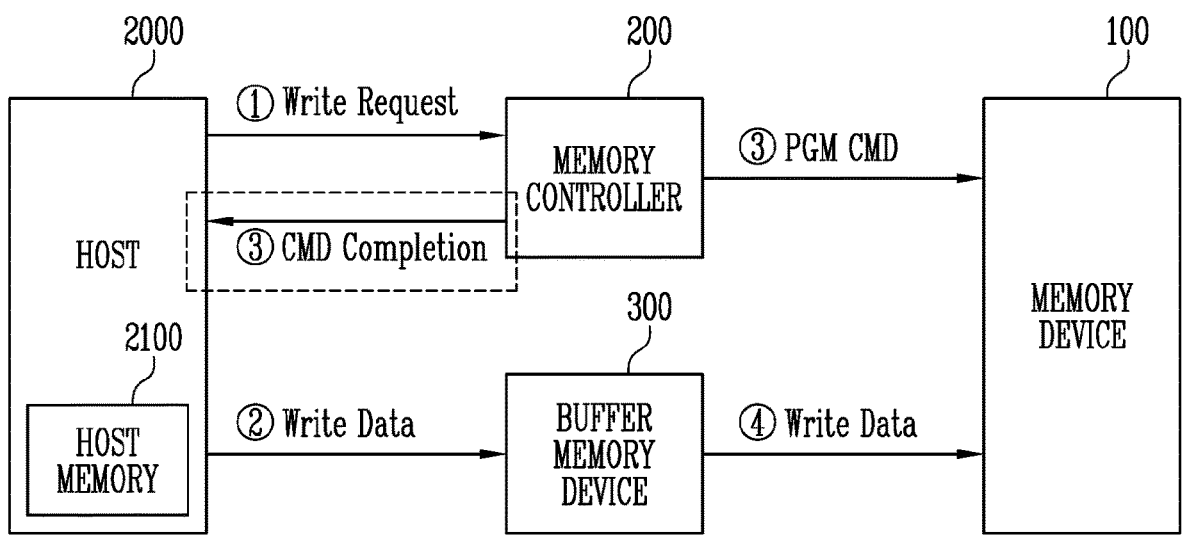
FIG. 8 is a block diagram illustrating a write operation of a storage device according to an embodiment of the present disclosure.

FIG. 8 is a block diagram illustrating a write operation of a storage device according to an embodiment of the present disclosure.

Referring to FIG. 8, after write data is fetched from the host memory 2100 to the buffer memory device 300, the memory controller 200 may transfer CMD completion to the host 2000.

Referring to FIG. 8, when the memory controller 200 receives a write request from the host 2000, the memory controller 200 may allocate write data corresponding to the write request to the buffer memory device 300. In addition, the memory controller 200 may control the buffer memory device 300 so that the write data stored in the host memory 2100 may be stored in the buffer memory device 300.

In addition, when the write data is buffered in the buffer memory device 300, the memory controller 200 may transfer the CMD completion to the host 2000.

In addition, the memory controller 200 may transfer a program command to the memory device 100 and control the buffer memory device 300 to transfer the write data buffered in the buffer memory device 300 to the memory device 100. When the memory device 100 receives the program command and the write data from the memory controller 200 and the buffer memory device 300, the memory device 100 may perform a program operation corresponding to the program command and the write data. Since the host 2000 receives the CMD completion, the host 2000 may release the write data stored in the host memory 2100. By releasing the write data stored in the host memory 2100, the host 2000 may use the host memory 2100 with efficiency.

Thereafter, when the program operation fails, the memory controller 200 may control the memory device 100 and the buffer memory device 300 to re-perform the program operation using the write data buffered in the buffer memory device 300.

Figure 9:
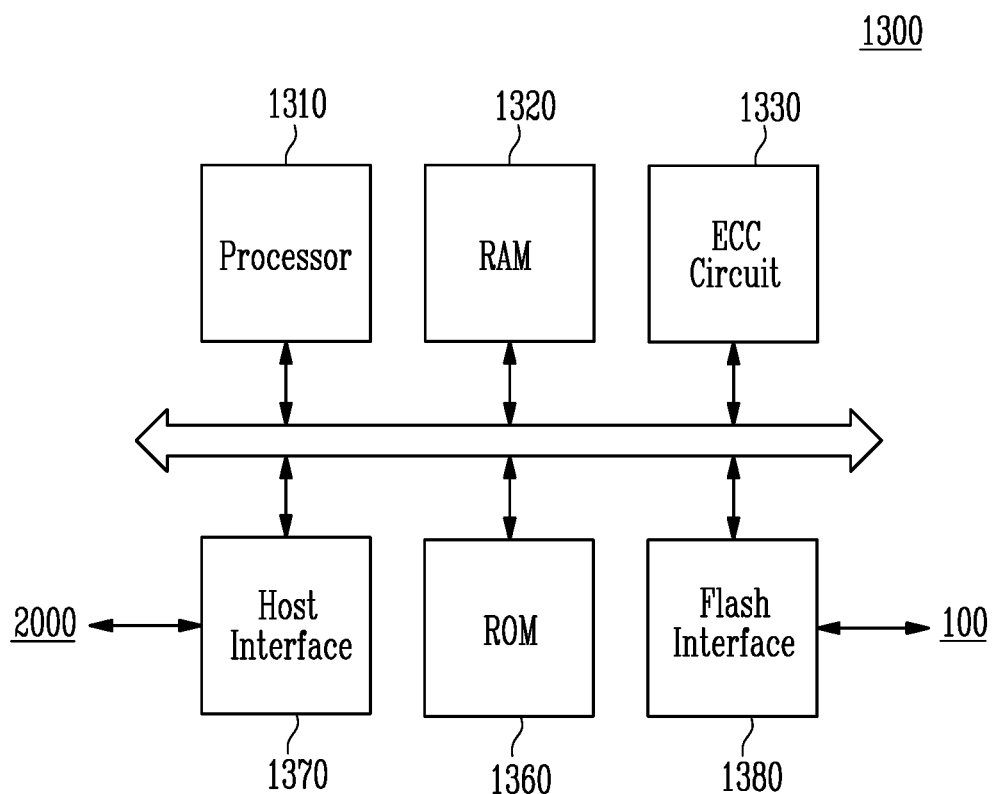
FIG. 9 is a block diagram illustrating a memory controller according to an embodiment of the present disclosure.

FIG. 9 is a block diagram illustrating a memory controller 1300 according to another embodiment of the present disclosure.

Referring to FIG. 9, the memory controller 1300 may include a processor 1310, a RAM 1320, an ECC circuit 1330, a ROM 1360, a host interface 1370, and a flash interface 1380.

The processor 1310 may communicate with the host 2000 using the host interface 1370 and perform a logical operation to control the operations of the memory controller 1300. For example, the processor 1310 may load program commands, data files, data structures, etc. based on a request from the host 2000 or another external device, and may perform various operations or generate commands or addresses. For example, the processor 1310 may generate various commands for a program operation, a read operation, an erase operation, a suspend operation, and a parameter setting operation.

In addition, the processor 1310 may function as a flash translation layer FTL. The processor 1310 may translate a logical block address LBA provided by the host 2000 into a physical block address PBA through the flash translation layer FTL. The flash translation layer FTL may receive the logical block address LBA and translate the logical block address LBA into the physical block address PBA by using a mapping table. There may be various address mapping methods of the flash translation layer FTL, based on a mapping unit. Typical address mapping methods may include a page mapping method, a block mapping method, and a hybrid mapping method.

According to an embodiment, the processor 1310 may generate a command without a request of the host 2000. For example, the processor 1310 may generate a command for background operations such as wear leveling operations of the memory device 100, and garbage collection operations of the memory device 100.

The RAM 1320 may serve as a buffer memory, a working memory, or a cache memory of the processor 1310. In addition, the RAM 1320 may store codes and commands executed by the processor 1310. The RAM 1320 may store data processed by the processor 1310. In addition, the RAM 1320 may be realized with static RAM (SRAM) or dynamic RAM (DRAM).

The ECC circuit 1330 may detect error(s) during a program operation or a read operation and correct the error(s). More specifically, the ECC circuit 1330 may perform an error correction operation according to an error correction code (ECC). In addition, the ECC circuit 1330 may perform ECC encoding based on data to be written to the memory device 100. The ECC-encoded data may be transferred to the memory device 100 through the flash interface 1380. In addition, the ECC circuit 1330 may perform ECC decoding on the data transferred from the memory device 100 through the flash interface 1380.

The ROM 1360 may serve as a storage unit for storing various types of information for operations of the memory controller 1300. More specifically, the ROM 1360 may include a map table that stores physical-logical address information and logical-physical address information. In addition, the ROM 1360 may be controlled by the processor 1310.

The host interface 1370 may include a protocol for exchanging data between the host 2000 and the memory controller 1300. More specifically, the host interface 1370 may communicate with the host 2000 through one or more various communication standards or interfaces such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial-ATA protocol, a parallel-ATA protocol, a small computer System interface (SCSI) protocol, an enhanced small disk interface (ESDI) protocol, an integrated drive electronics (IDE) protocol, a private protocol, etc.

The processor 1310 may control the flash interface 1380 to communicate with the memory device 100 using a communication protocol. More specifically, the flash interface 1380 may transmit/receive commands, addresses, and data to/from the memory device 100 through channels. For example, the flash interface 1380 may include a NAND interface.

Figure 10:
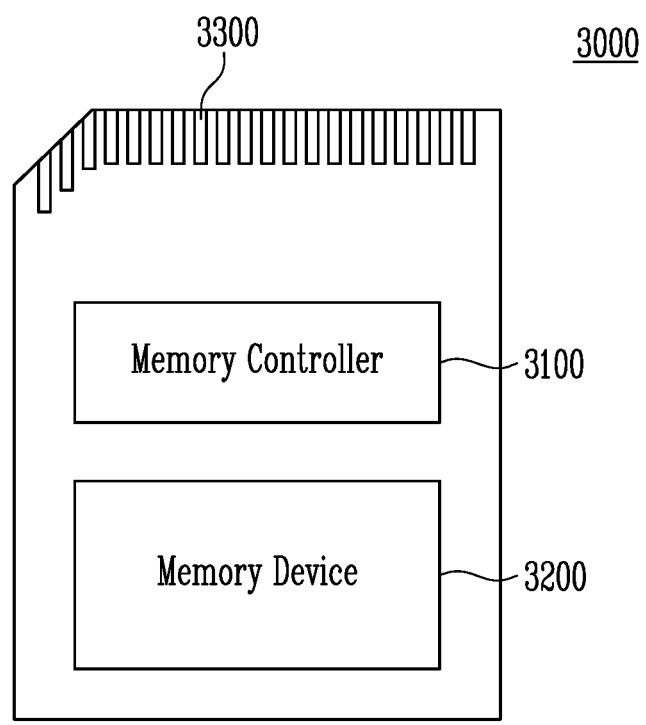
FIG. 10 is a block diagram illustrating a memory card system according to an embodiment of the present disclosure.

FIG. 10 is a block diagram illustrating a memory card system 3000 according to an embodiment of the present disclosure.

Referring to FIG. 10, the memory card system 3000 may include a memory controller 3100, a memory device 3200, and a connector 3300.

The memory controller 3100 may be coupled to the memory device 3200. The memory controller 3100 may access the memory device 3200. For example, the memory controller 3100 may control read, program, erase, and background operations of the memory device 3200. The memory controller 3100 may be configured to provide an interface between the memory device 3200 and the host 2000. The memory controller 3100 may be configured to drive firmware for controlling the memory device 3200.

In an embodiment, the memory controller 3100 may include components, such as a Random Access Memory (RAM), a processing unit, a host interface, a flash interface, and an ECC circuit.

The memory controller 3100 may communicate with an external device through the connector 3300. The memory controller 3100 may communicate with an external device (e.g., host) based on a specific communication protocol. In an embodiment, the memory controller 3100 may communicate with the external device through at least one of various communication standards or interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, WiFi, Bluetooth, and nonvolatile memory express (NVMe) protocols. In an embodiment, the connector 3300 may be defined by at least one of the above-described various communication standards or interfaces.

In an embodiment, the memory device 3200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin-Transfer Torque Magnetic RAM (STT-MRAM).

The memory controller 3100 and the memory device 3200 may be integrated into a single semiconductor device to form a memory card. For example, the memory controller 3100 and the memory device 3200 may be integrated into a single semiconductor device to form a memory card, such as a personal computer memory card international association (PCMCIA) card, a compact flash (CF) card, a memory stick, an SD card (SD, miniSD, microSD, or SDHC), and the like.

Figure 11:
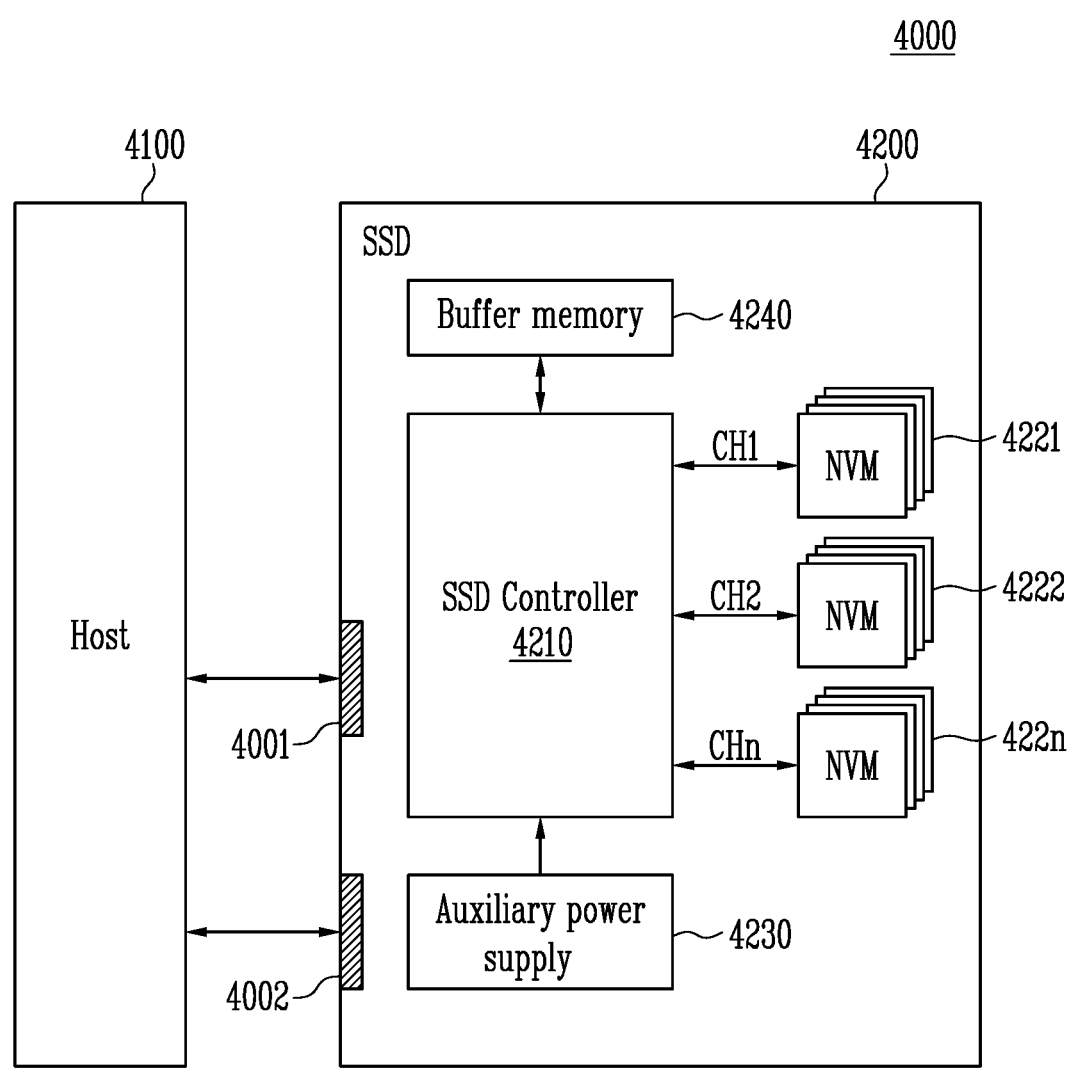
FIG. 11 is a block diagram illustrating a solid state drive (SSD) system according to an embodiment of the present disclosure.

FIG. 11 is a block diagram illustrating a solid state drive (SSD) system 4000 according to an embodiment of the present disclosure.

Referring to FIG. 11, the SSD system 4000 may include a host 4100 and an SSD 4200. The SSD 4200 may exchange signals with the host 4100 through a signal connector 4001 and may receive power through a power connector 4002. The SSD 4200 may include an SSD controller 4210, a plurality of flash memories 4221 to 422*n*, an auxiliary power supply 4230, and a buffer memory 4240.

In an embodiment, the SSD controller 4210 may perform the function of the memory controller 200 as described above with reference to FIG. 1. The SSD controller 4210 may control the plurality of flash memories 4221 to 422*n* in response to the signals received from the host 4100 through channels CH1~CHn. In an embodiment, the signals may be based on the interfaces of the host 4100 and the SSD 4200. For example, the signals may be defined by at least one of various communication standards or interfaces such as universal serial bus (USB), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, Wifi, Bluetooth, and nonvolatile memory express (NVMe) interfaces.

The auxiliary power supply 4230 may be coupled to the host 4100 through the power connector 4002. The auxiliary power supply 4230 may be supplied and charged with the power from the host 4100. The auxiliary power supply 4230 may supply the power to the SSD 4200 when the power is not smoothly supplied from the host 4100. In an embodiment, the auxiliary power supply 4230 may be positioned inside or outside the SSD 4200. For example, the auxiliary power supply 4230 may be disposed in a main board and may supply auxiliary power to the SSD 4200.

The buffer memory 4240 may serve as a buffer memory for the SSD 4200. For example, the buffer memory 4240 may temporarily store data received from the host 4100 or data received from the plurality of flash memories 4221 to 422*n*, or may temporarily store metadata (e.g., mapping tables) of the flash memories 4221 to 422*n*. The buffer memory 4240 may include volatile memories such as DRAM, SDRAM, DDR SDRAM, LPDDR SDRAM, and GRAM, or nonvolatile memories such as FRAM, ReRAM, STT-MRAM, and PRAM.

Figure 12:
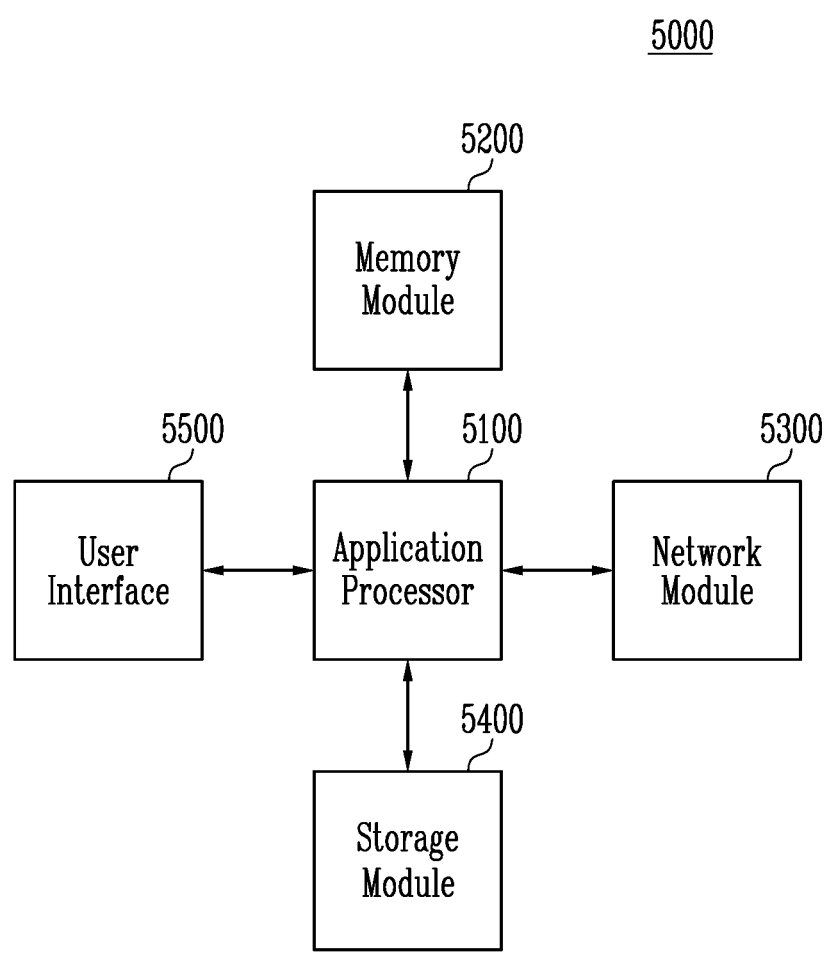
FIG. 12 is a diagram illustrating a user system according to an embodiment of the present disclosure.

FIG. 12 is a block diagram illustrating a user system 5000 according to an embodiment of the present disclosure.

Referring to FIG. 12, the user system 5000 may include an application processor 5100, a memory module 5200, a network module 5300, a storage module 5400, and a user interface 5500.

The application processor 5100 may run components included in the user system 5000, an Operating System (OS), or a user program. In an embodiment, the application processor 5100 may include controllers, interfaces, graphic engines, etc. for controlling the components included in the user system 5000. The application processor 5100 may be provided as a system-on-chip (SoC).

The memory module 5200 may function as a main memory, a working memory, a buffer memory or a cache memory of the user system 5000. The memory module 5200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 5100 and the memory module 5200 may be packaged based on package-on-package (POP) and may then be provided as a single semiconductor package.

The network module 5300 may communicate with external devices. For example, the network module 5300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WIMAX, WLAN, UWB, Bluetooth, or WiFi communication. In an embodiment, the network module 5300 may be included in the application processor 5100.

The storage module 5400 may store data. For example, the storage module 5400 may store data received from the application processor 5100. Alternatively, the storage module 5400 may transmit the data stored in the storage module 5400 to the application processor 5100. In an embodiment, the storage module 5400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 5400 may be provided as a removable storage medium (i.e., removable drive), such as a memory card or an external drive of the user system 5000.

For example, the storage module 5400 may include a plurality of non-volatile memory devices, and the plurality of non-volatile memory devices may operate in the same manner as the memory device 100 described above with reference to FIG. 1. The storage module 5400 may operate in the same manner as the storage device 1000 as described above with reference to FIG. 1.

The user interface 5500 may include interfaces which input data or commands to the application processor 5100 or output data to an external device. In an embodiment, the user interface 5500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 5500 may further include user output interfaces such as a Liquid Crystal Display (LCD), an Organic Light Emitting Diode (OLED) display device, an Active Matrix OLED (AMOLED) display device, an LED, a speaker, and a monitor.

According to the present disclosure, a storage device that efficiently uses a buffer memory device and a method of operating the storage device may be provided.

The embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A storage device, comprising:
a memory device including a plurality of memory cells and performing a program operation to store write data in the plurality of memory cells;
a buffer memory device temporarily storing therein the write data; and
a memory controller controlling the buffer memory device and the memory device to temporarily store in the buffer memory device, the write data received from a host memory included in a host and provide the write data from the buffer memory device to the memory device in response to a write command received from the host,
wherein, when a used capacity of the buffer memory device is greater than a threshold, the memory controller is configured to:
control the buffer memory device to release the write data temporarily stored in the buffer memory device after providing the write data from the buffer memory device to the memory device;
fetch data corresponding to the write data from the host memory to the buffer memory device from which the write data has been released when the program operation of the write data fails;
control the buffer memory device to transfer the fetched data corresponding to the write data of which the program operation has failed to the memory device; and
transfer, to the host, a command completion with respect to the write command at a point in time after the program operation of storing the fetched data in the plurality of memory cells is successful.

2. The storage device of claim 1, wherein the memory controller further controls the buffer memory device to release the fetched data temporarily stored in the buffer memory device after providing the fetched data from the buffer memory device to the memory device.

3. The storage device of claim 1, wherein the memory controller determines, based on a size of the write data stored in the buffer memory device according to the write command, when to transfer the command completion with respect to the write command.

4. A storage device comprising:
a memory device including a plurality of memory cells and configured to perform a write operation to store write data in the plurality of memory cells;
a buffer memory device temporarily storing the write data to be provided to the memory device; and
a memory controller controlling the buffer memory device and the memory device to fetch the write data from a host memory to the buffer memory device and provide, to the memory device, the write data temporarily stored in the buffer memory device in response to a write request received from a host,
wherein, when a multi-program flag, which indicates a plurality of write operations, included in the write request has a predetermined value, the memory controller is configured to:

control the buffer memory device to release the write data temporarily stored in the buffer memory device after providing the write data from the buffer memory device to the memory device;

fetch data corresponding to the write data from the host memory to the buffer memory device from which the write data has been released when the write operation of the write data fails;

control the buffer memory device to transfer the fetched data corresponding to the write data of which the write operation has failed to the memory device; and transfer, to the host, a command completion with respect to the write request at a point in time after the write operation of storing the fetched data in the plurality of memory cells is successful.

5. The storage device of claim 4, wherein the memory controller further controls the buffer memory device to release the fetched data temporarily stored in the buffer memory device after providing the fetched data from the buffer memory device to the memory device.

6. A method of operating a memory controller, the method comprising:

receiving a write command from a host;

allocating, to a buffer memory device, write data corresponding to the write command and received from a host memory;

storing the write data in the buffer memory device;

determining when to transfer, to the host, a command completion with respect to the write command;

providing a memory device with a program command and the write data stored in the buffer memory device;

controlling the memory device to perform a program operation with the provided write data;

controlling the buffer memory device to release the write data stored in the buffer memory device;

fetching data corresponding to the write data from the host memory to the buffer memory device in response to the program operation of the write data failing;

controlling the buffer memory device to transfer the fetched data corresponding to the write data of which the program operation has failed to the memory device; and transferring the command completion to the host in response to the program operation of storing the fetched data in the memory device being successful.

7. The method of claim 6, wherein the determining comprises determining, based on a used capacity of the buffer memory device, when to transfer the command completion.

8. The method of claim 6, wherein the determining comprises determining, based on a multi-program flag indicating a plurality of program operations, when to transfer the command completion.

* * * * *